United States Patent [19]
Haas

[11] Patent Number: 5,815,257
[45] Date of Patent: Sep. 29, 1998

[54] PORTABLE OPTICAL WHEEL ALIGNMENT APPARATUS AND METHOD FOR RACE CARS

[76] Inventor: Paul M. Haas, 1952 Zapo St., Del Mar, Calif. 92014

[21] Appl. No.: 775,389

[22] Filed: Dec. 30, 1996

[51] Int. Cl.⁶ .................................................. G01B 11/26
[52] U.S. Cl. .................... 356/155; 356/139; 356/139.04; 356/139.09
[58] Field of Search .................................. 356/155, 139, 356/139.04, 139.09

[56] References Cited

U.S. PATENT DOCUMENTS

| | | | |
|---|---|---|---|
| 3,865,492 | 2/1975 | Butler | 356/155 |
| 4,330,945 | 5/1982 | Eck | 356/155 |

OTHER PUBLICATIONS

Two Page Article re Operating Instructions on AGO/40 Optical Alignment Gauge (Garage Equipment Maintenance Co. Ltd.) GEM.

*Primary Examiner*—David C. Nelms
*Assistant Examiner*—Reginald A. Ratliff
*Attorney, Agent, or Firm*—Fulwider Patton Lee & Utecht, LLP

[57] ABSTRACT

An optical wheel alignment apparatus intended for race cars and other high performance road vehicles which provides an extremely accurate, low-cost, light-weight, portable and non-electrical method for toe and camber alignments even in space limited and hostile environments such as race car pit areas. Further, the apparatus is simple to operate, requires less that five-minutes set-up time and provides repeatable accuracy up to two minutes of a degree toe and ⅛" camber without the aid of computer control.

27 Claims, 9 Drawing Sheets

PORTABLE OPTICAL WHEEL ALIGNMENT APPARATUS AND METHOD FOR RACE CARS

BACKGROUND OF THE INVENTION

1. Field of the Invention

This invention relates to an optical wheel alignment apparatus, and more particularly to a portable wheel alignment system and method for high performance race car vehicles where rapid, highly accurate and cost effective alignments of camber and toe can be performed at a race site.

2. Description of Related Art

Generally, state-of-the-art wheel alignment has become computer controlled with laser and, more recently, microwave technology for alignment measurements. These apparatus are intended for shop use, are large systems with computer type screens and keyboards. Typically, a plurality of automobile manufacturer designs and model specifications will be already loaded into the computer memory. Information such as manufacturer settings of caster, steering axis inclination, chassis center point and recommended camber and toe will be readily available to the operator for the specific automobile on the alignment rack. These apparatus are designed for consumer automobile and truck wheel alignments, not for high-performance race cars such as formula, sport and Indy type cars.

In today's technology, when mechanics for high-performance race cars have needed wheel alignment apparatus they have tried modifying consumer oriented wheel alignment apparatus such as those discussed prior. What could not be modified out of these alignment apparatus was the bulkiness and awkwardness of these computer oriented alignment tools with display panels and interconnecting cables. Add to this disadvantage the fact that set-up times for these apparatus can be unacceptably long and the fact that the computer has to be programmed for each customized race car before the alignment can be performed, and it becomes evident that simply modifying today technology wheel alignment apparatus for use in the race car environment is not the answer.

What has been needed is a simple, inexpensive, light weight, and perhaps even portable, wheel alignment apparatus that will immediately work for any customized formula, sports, or Indy, type race car without the need for sophisticated computer hardware and software with viewing screen, bulky interconnecting cables and heavy housing assembly.

This invention provides such an apparatus for checking, and adjusting wheel alignment on high performance race cars.

SUMMARY OF THE INVENTION

This invention is directed to a race car wheel alignment apparatus wherein the apparatus utilizes a telescope and target much like a surveyor's theodolite to simultaneously measure toe and camber and allow precise adjustments, (repeatable to within two minutes of a degree), without the need for computer interaction. Furthermore, this wheel alignment apparatus is designed to operate in the hostile, and what would be for above mentioned reference art impractical, race crew pit areas during a race when emergency wheel alignment may be required.

The apparatus provides one-half inch thick aluminum, or similar light weight material, plates, (called rocker plates), which bolt to the hubs of one axle in place of the wheels. A telescope, with cross hairs visible through the viewer end, is clamped onto one of the rocker plates. A target, with camber and toe calibration markings, is attached to the opposite rocker plate. In this embodiment of the invention, by viewing through the telescope, the cross hairs appear superimposed on the target which simultaneously indicates toe and camber measurements of the wheel hub to which the telescope is mounted. The toe and camber settings can then be adjusted, on most race cars, by tie rod or toe control rod end adjustments while instantly observing the results through the telescope viewer without the necessity of further measuring or fiddling with other alignment tools or apparatus. Any effect that a camber change may have on the toe setting, or visa versa, will be instantly observable without the need for removing one alignment apparatus to be replaced with a second alignment apparatus.

The wheel alignment apparatus of this invention is capable of resolving 1 minute, (1/60th of a degree or 0.003"), at a wheel hub representing a tire and is repeatable to 2 minutes. One reason this wheel alignment apparatus is more accurate and repeatable than most reference art is because this invention eliminates wheel run out, (the wheels are not attached to the hub during alignment), and parallax is eliminated as a source of error.

The rocker plates are trued into a perfectly vertical position by use of an ultra sensitive level, which is built into the telescope base, and an adjustment tool. Once the rocker plates, attached to both wheel hubs, have been vertically trued the telescope is mounted to one rocker plate and the target plate is mounted to the other rocker plate. The telescope and the target plate are indexed to their respective rocker plates, both fore and aft, by roll pins in their clamp assemblies.

Calibration of the telescope is accomplished with a calibrator plate which clamps onto the telescope and allows the telescope to be rotated ±90° about the horizontal line of sight. If the telescope is precisely 90° to the plate in all directions, that line of sight will fall on the same point on the target without any wobble while the telescope is being rotated. Any variation in the line of sight location on the target during calibration can be adjusted out by use of toe and camber adjustments screws provided on the telescope body.

Since each wheel is aligned independently, the optical wheel alignment apparatus doesn't care if two-wheel or four-wheel alignment is to be performed.

Other features and advantages of the present invention will become more apparent from the following detailed description of the invention when taken in conjunction with the accompanying drawings.

BRIEF DESCRIPTION OF THE DRAWINGS

FIG. 2a is a partial cross-sectional view of the telescope mounting assembly viewed at lines 3—3 in FIG. 2.

DETAILED DESCRIPTION OF THE PREFERRED EMBODIMENT

The present invention includes a method and apparatus for wheel alignment on race cars which is compact, light weight, inexpensive, and simple to operate.

Figure 1:
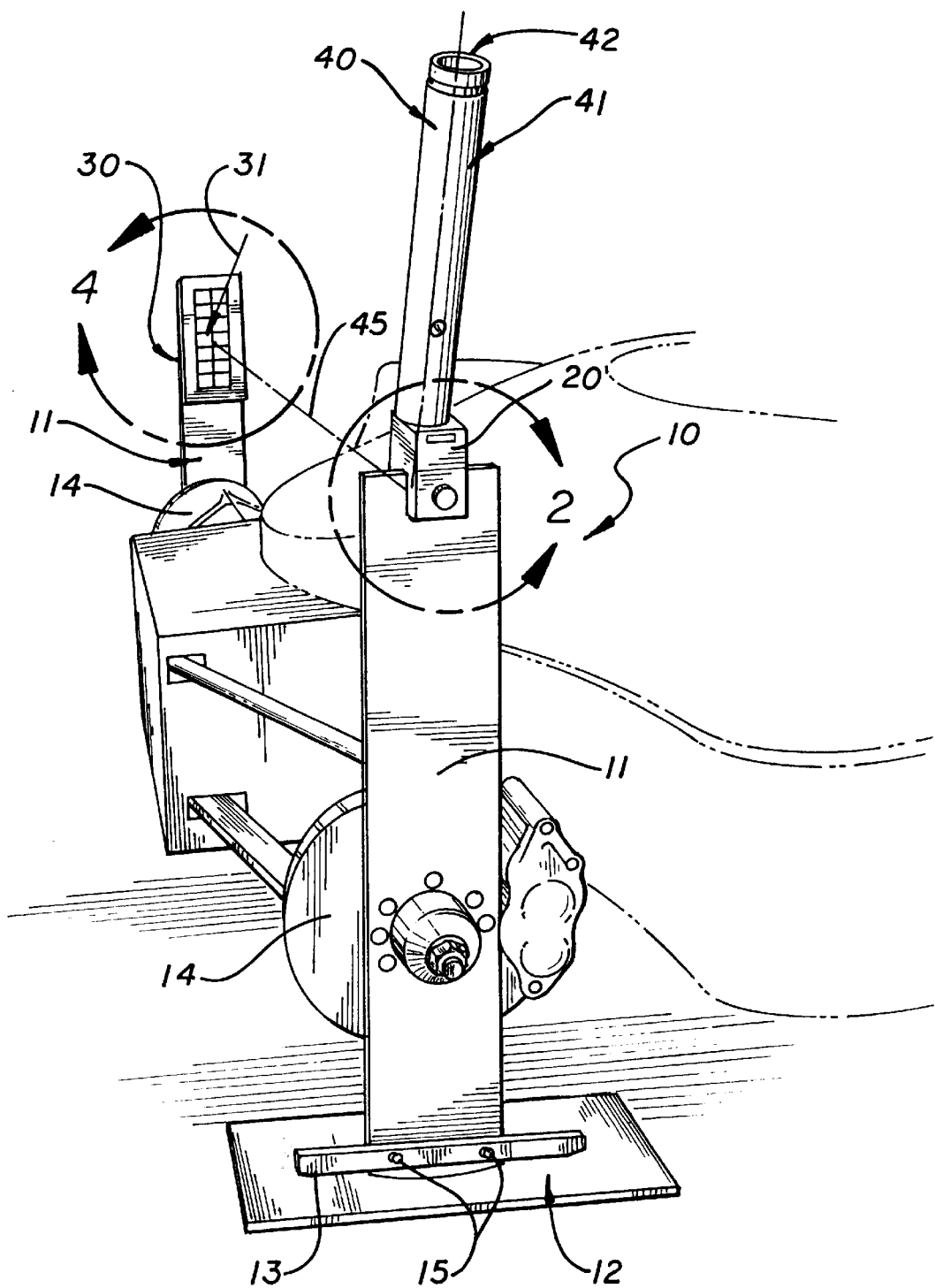
FIG. 1 is a perspective view of the optical wheel alignment apparatus which depicts the two rocker plates mounted to wheel hubs with the telescope mounted to one rocker plate and the target plate mounted to the opposite rocker plate.

Referring now to the drawings, and particularly to FIG. 1, there is shown a typical set-up of the optical wheel alignment apparatus 10 wherein the front wheels of the race car have been removed from the wheel hubs 14 and replaced by the rocker plates 11. The rocker plates 11 with rocker stops 13 have then been raised and the surface plates 12 inserted so that the rocker plates 11 can be vertically trued and leveled through minor adjustments of the rocker plates orientation. The rocker plates 11 extend far enough above the chassis of the race car to provide a clear line of sight 45 between the two opposite rocker plates 11. In FIG. 1, the telescope assembly mounting base 20, the telescope assembly 40 and the target plate assembly 30 with toe and camber calibration chart 31 have been installed as would be the case during a wheel alignment procedure after the apparatus had been calibrated, a procedure described later.

Figure 2:
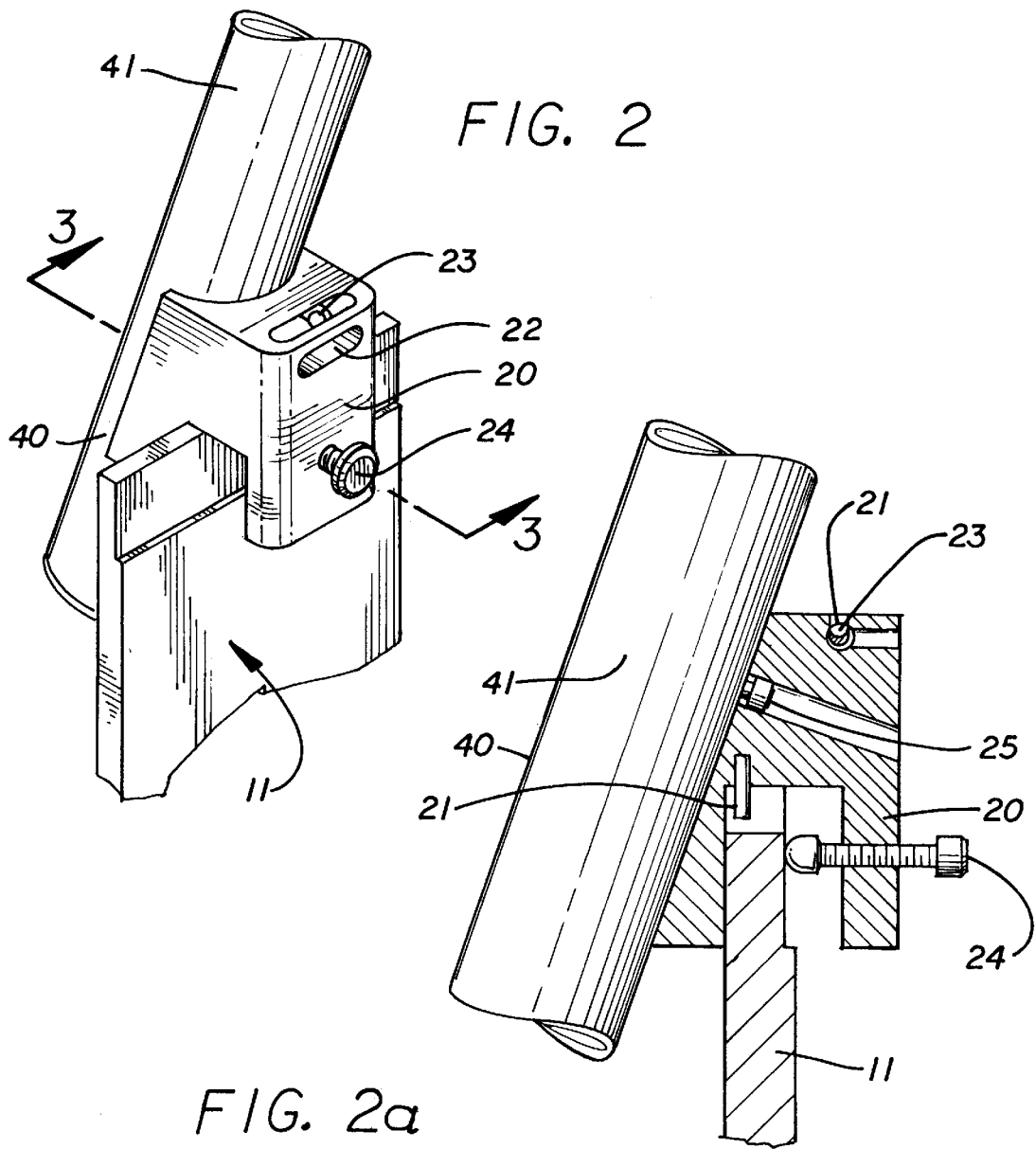
FIG. 2 is an exploded perspective view at 2 in FIG. 1 which depicts the telescope mounting assembly with integral precision level.

Referring now to FIGS. 2 and 2a, the elements of the telescope assembly mounting base 20 are detailed. In the preferred embodiment, the telescope assembly mounting base 20 comprises at least one roll pin 21 to ensure repeatability of precision alignment of the mounting base 20, a highly precise bubble type level 23 with two windows 22, for viewing the level, machined into the top and outer side of the mounting base 20. The telescope assembly mounting base 20 further includes a thumb screw 24 for securing the mounting base 20 to one of the rocker plates 11. A final element of the telescope assembly mounting base comprises a countersunk and captive set screw 25 which secures the telescope assembly 40 into a machined cradle of the mounting base 20 that fits the outside dimensions of the telescope housing 41. The telescope assembly 40 and mounting base 20 are assembled at the factory and may be treated as a single assembly.

Figure 3:
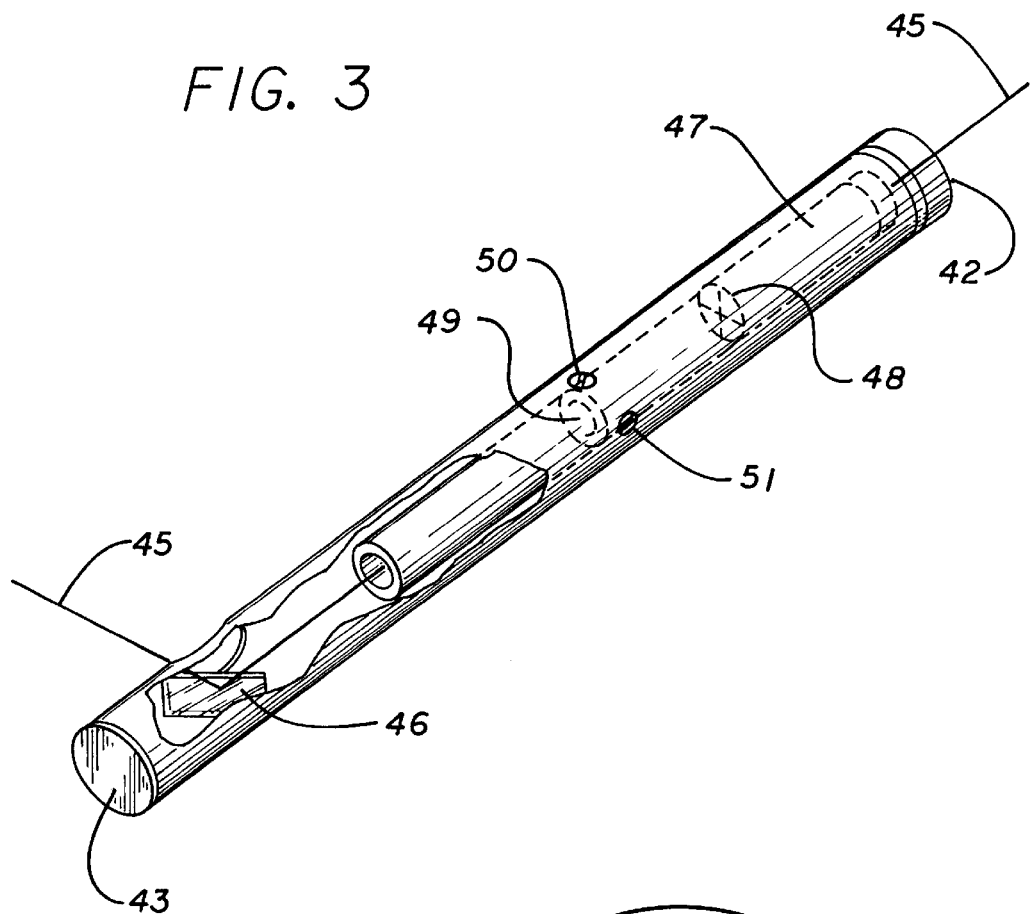
FIG. 3 is perspective drawing of the telescope assembly of the invention with a partial cutaway section for viewing internal components.

Turning now to the telescope assembly 40 and FIG. 3, the telescope housing 41 has a proximal end with a viewers window 42, (also referred to as the eye piece of the telescope assembly 40), and a distal end which is closed off 43. Inside the telescope housing 41, near the distal end of said housing a mirror 46 is mounted at such an angle as to reflect the image in the line of sight 45 to the viewer's window 42. The telescope 47 has superimposed upon its line of sight 45 a pair of crossing hairlines 48 intersecting at the precise center of the viewing window 42. It is these hairlines that the mechanic sees superimposed on the target chart 31 image that identifies the amount of toe and camber present during wheel alignment. Not shown in FIG. 3 are two set screws in the telescope housing 41 side wall which allow precision setting of the toe and camber lens during telescope calibration, discussed later. These set screws 50 and 51 are visible in FIG. 7.

Figure 4B:
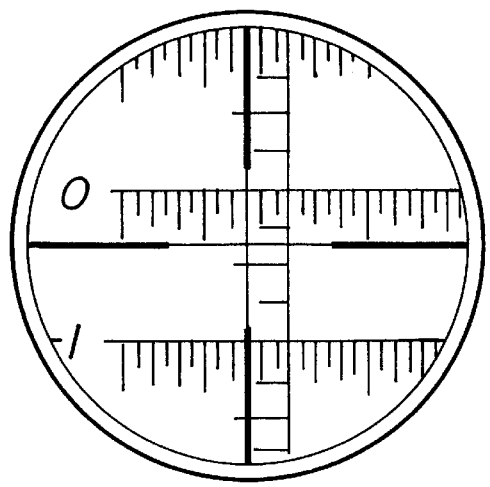
FIG. 4b is a perspective view of what an operator may see through the viewer of the telescope during an actual wheel alignment check.
Figure 4:
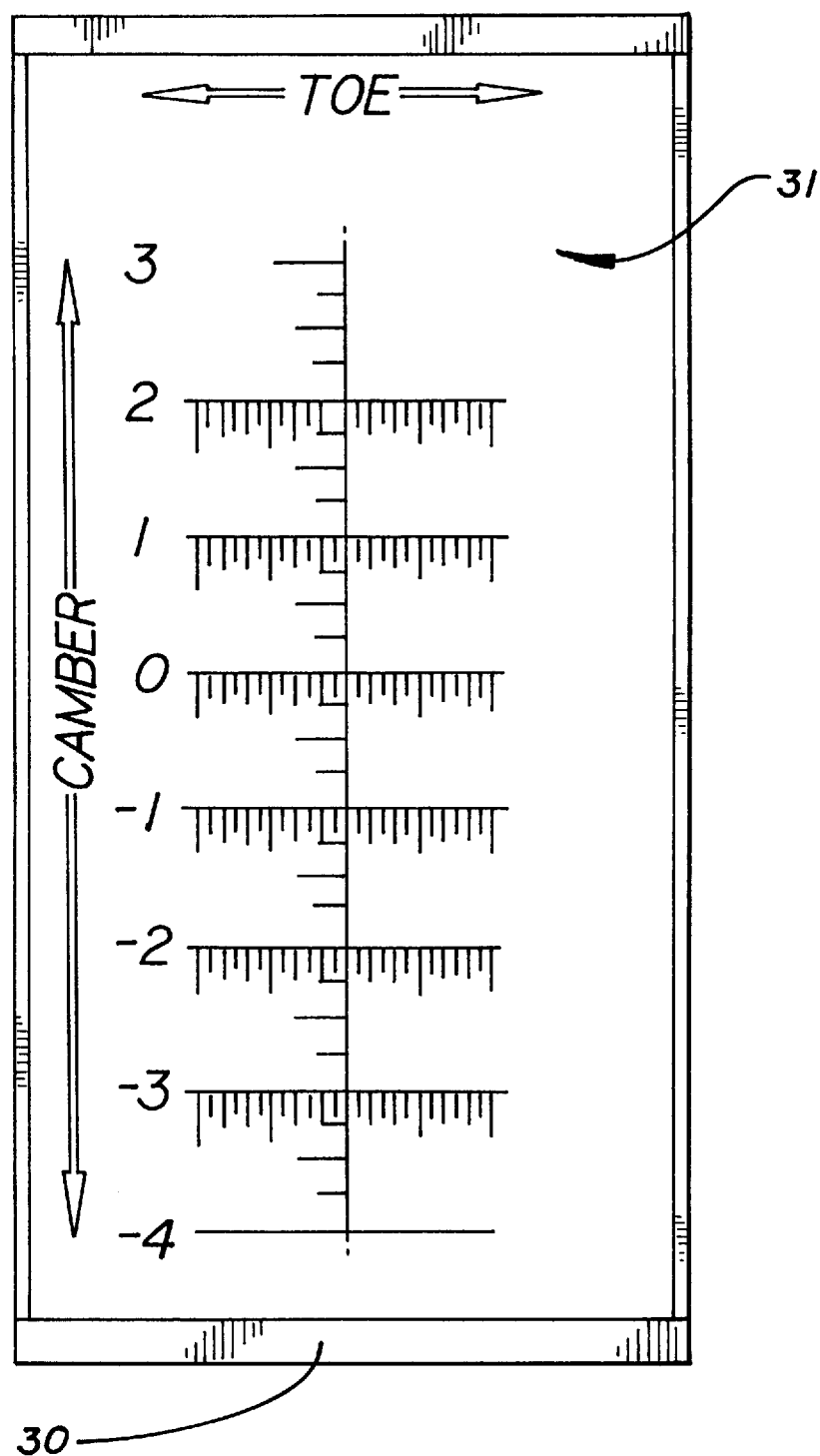
FIG. 4 is a perspective view of the information obtained by the operator from the TOE and CAMBER target plate when viewed through the telescope.
Figure 4A:
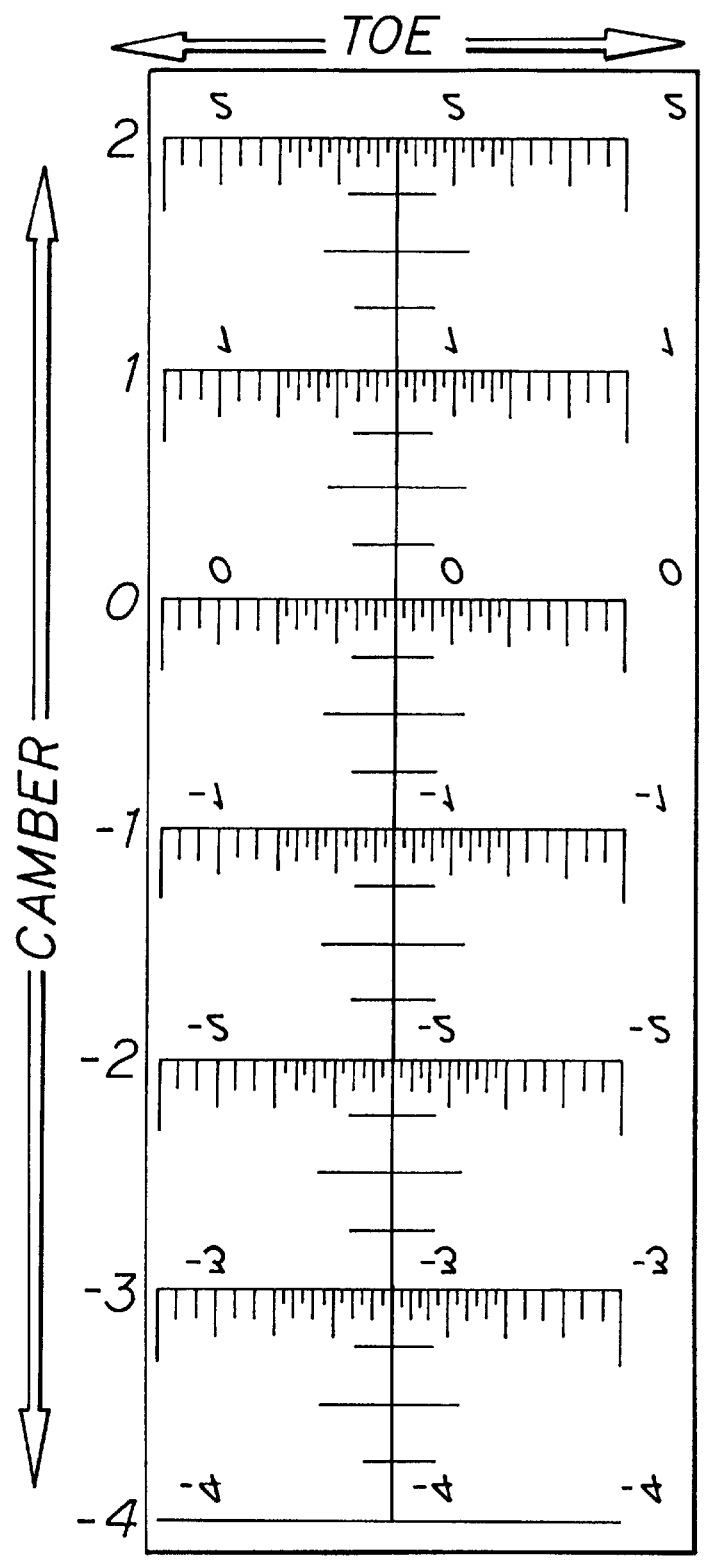
FIG. 4a is a perspective view of the TOE and CAMBER target plate as it actually appears on a frontal view, before being reversed by the mirror in the telescope.

FIG. 4 is a rendition of what the toe and camber alignment chart 31 will look like to the mechanic as viewed from the proximal end 42 of the telescope assembly 40, except that the superimposed hairlines from the mirror 46 have been omitted. In reality, the toe and camber alignment chart 31' shown in FIG. 4a is what the mechanic will see if viewing the chart directly. This discrepancy of the view is necessary since the image of the toe and camber alignment chart 31' attached to the target plate 30 is reversed, (in fact, turned up side down), by the mirror 46 in the telescope housing 41. FIG. 4b shows what the mechanic will see when viewing target 31 through telescope assembly 40 with the crosshairs superimposed.

Figure 5:
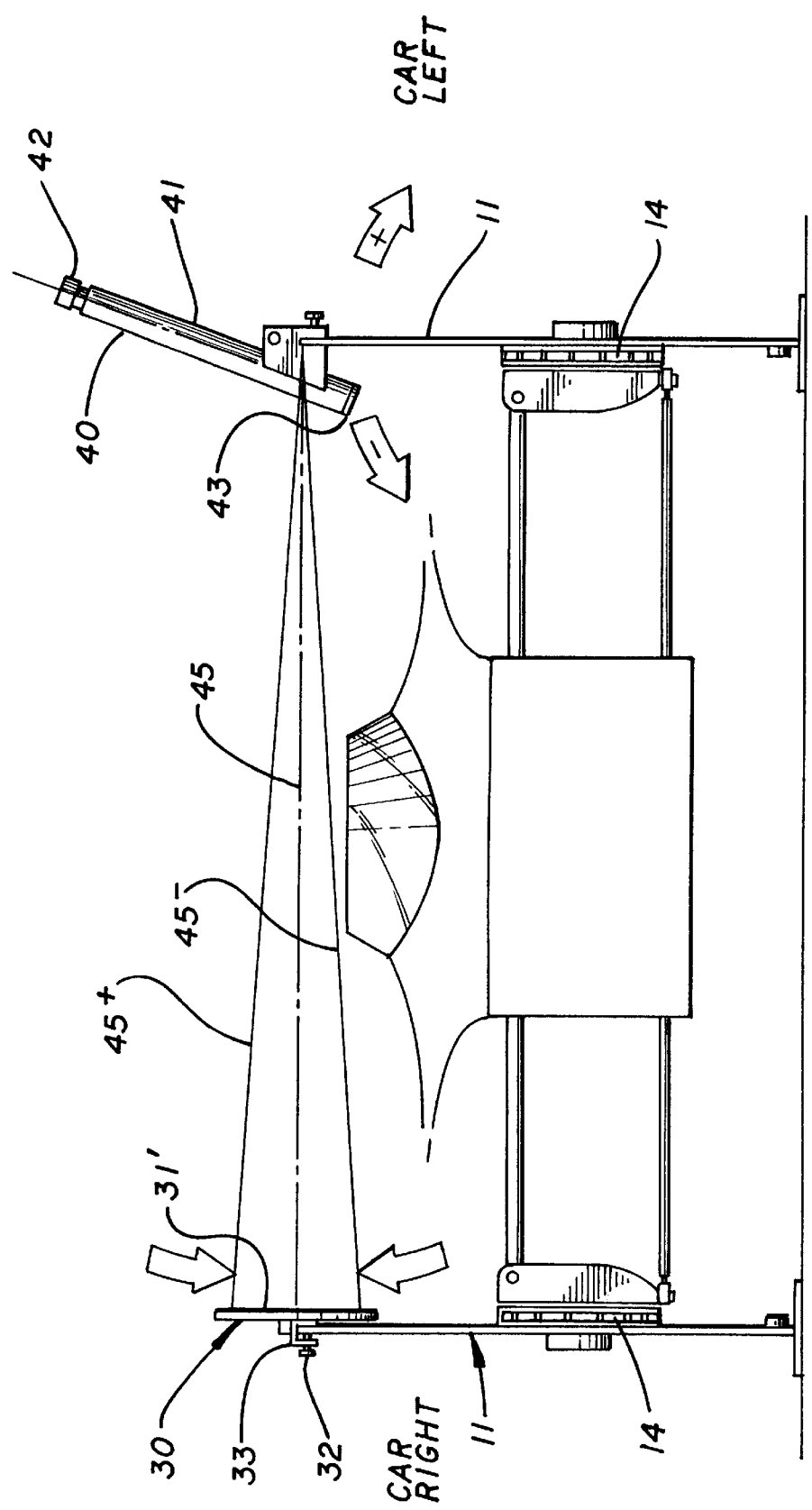
FIG. 5 is a perspective view of a typical alignment configuration, when viewed from the front of the race car, which depicts how the camber hairline would move on the target relative to camber adjustments of the wheel hub.
Figure 6:
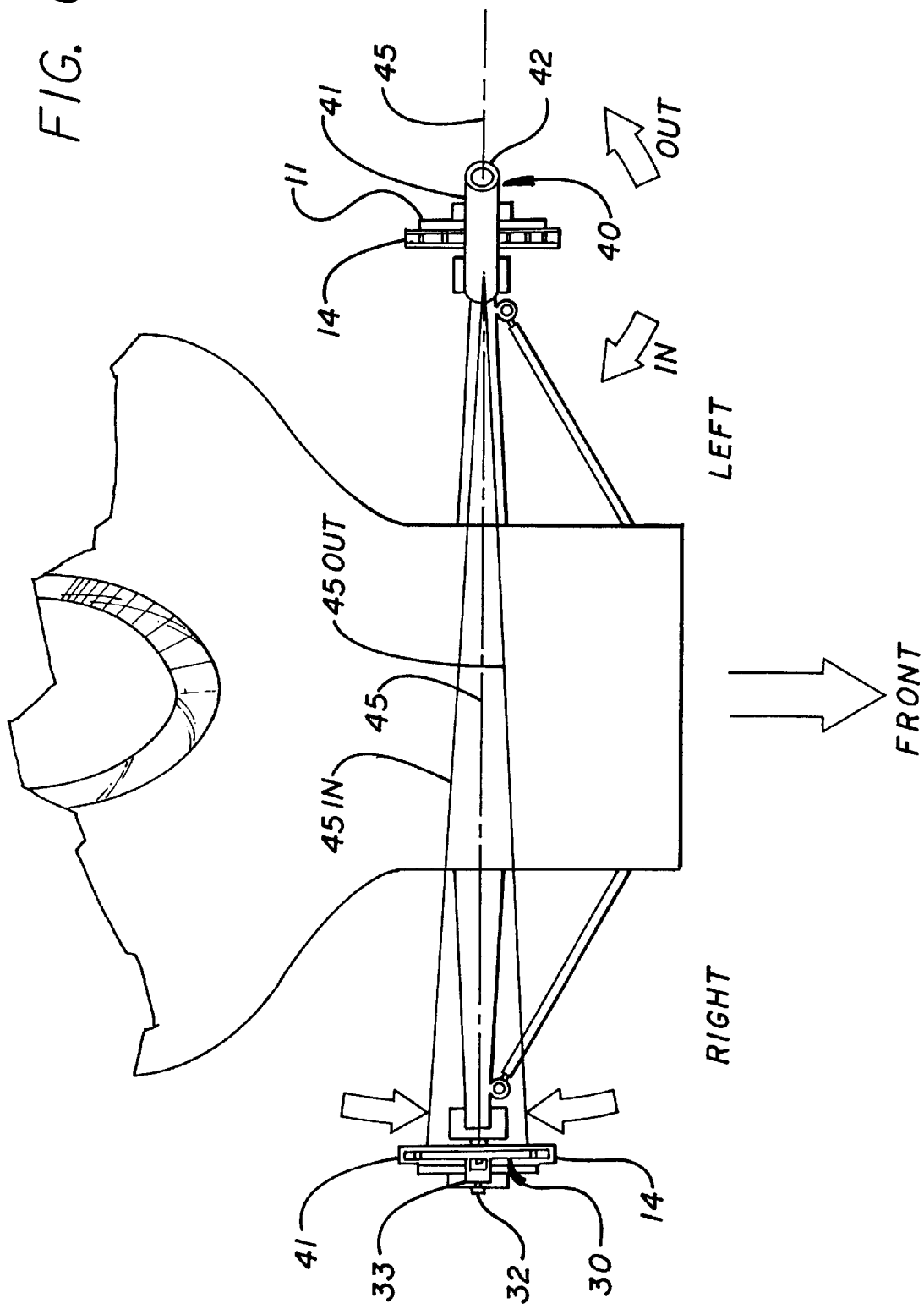
FIG. 6 is a perspective view of a typical alignment configuration, when viewed from above the race car, which depicts how the toe hairline would move on the target relative to toe adjustments of the wheel hub.

Looking now at FIG. 5 a typical wheel alignment configuration is shown for the invention. In this rendition the viewer is looking at the front of the race car with the telescope assembly 40 attached to the rocker plate 11 that replaces the left wheel of the race car and the target plate assembly 30 is mounted to the rocker plate 11 that replaces the right wheel of the race car. In this rendition variations in camber settings are depicted. With no camber set into the left wheel hub 14, the line of sight 45 would place the horizontal cross hair at the center of the toe and camber alignment chart 31' indicated as line of sight 45 in FIG. 5. If positive camber of the left wheel hub 14 existed, the rocker plate 11 would be moved at the top in the direction of the right arrow in FIG. 5. This would have the effect of moving the horizontal cross hair towards the line of sight 45$^+$, (or upward on the toe and camber alignment chart) indicating to the mechanic viewing through the telescope assembly at 42 a positive camber. A negative camber in the left wheel hub 14 would have the effect of moving the top of the left rocker plate 11 towards the left arrow on FIG. 5 and thus the horizontal cross hair on the toe and camber alignment chart toward the 45-line of sight thereby indicating a negative camber to the mechanic viewing at 42. When the telescope assembly 40 and target plate assembly 30 are moved to the opposite rocker plates 11, the same camber setting will produce the same resultant views to the mechanic at the telescope assembly 40 viewing end 42. Now viewing FIG. 6 we see a rendition of a typical optical wheel alignment configuration of the invention as would be seen from directly above the race car looking down on the front axle. Here again the telescope assembly 40 is mounted to the rocker plate 11 that is mounted to the left wheel hub 14 replacing the left wheel of the race car. In this rendition variations in wheel toe settings are depicted. With no toe set into the left wheel hub 14, the line of sight 45 would place the vertical cross hair at the lateral center of the toe and camber alignment chart 31' indicated as line of sight 45 in FIG. 6. If toe-in of the left wheel hub 14 existed, the rocker plate 11 would be rotated in the direction of the left arrow in FIG. 6. This would have the effect of moving the vertical cross hair towards the line of sight $45^{in}$, (or towards the right on the toe and camber alignment chart 31') indicating to the mechanic viewing through the telescope assembly at 42 a toe-in wheel condition. A toe-out condition in the left wheel hub 14 would have the effect of rotating the left rocker plate 11 towards the right arrow on FIG. 6 and thus the vertical cross hair superimposed on the toe and camber alignment chart 31' toward the $45^{out}$ line of sight thereby indicating a toe-out wheel condition to the mechanic viewing at 42. When the telescope assembly 40 and target plate assembly 30 are moved to the opposite rocker plates 11, the same toe-in or toe-out wheel condition will produce the same resultant views to the mechanic at the telescope assembly 40 viewing end 42 with one exception noted on the target. That exception is that vertical cross hairs superimposed on target 11 to the rear of target 11's vertical centerline, represents toe-in in all cases (left or right wheels).

Calibration

Any alignment apparatus requires that the equipment to be used in the alignment procedure be calibrated to ensure compliance to operation within the design parameters of the apparatus. The optical wheel alignment apparatus of this invention includes calibration tools and procedures to ensure design parameters are met. The telescope calibration plate must be manufactured with a width (left to right) and index slots placed so as to produce an identical line of sight at the mirror surface regardless of the −90° or +90° installation.

Referring now to FIGS. 1 and 2, the following set-up and calibration procedures are incorporated as part of the invention. The set-up procedures in this paragraph must be performed before alignment of any car or calibration of the instrument. Once the front axle wheels have been replaced with rocker plates 11 mounted to the respective wheel hubs 14 and the surface plates 12 and rocker stops 13 are in place, an elastic device (spring or bungee) is used to only slightly apply the car's brakes. The rocker plates 11 are radiused on the bottom surface to accommodate slight forward and backward motion. While viewing the bubble level 23 on the telescope assembly mounting base 20, a screwdriver or lever is inserted between the rocker stop 13 and the surface plate 12. This is used to lift and slightly rotate the rocker plate until it is perfectly true vertically as indicated by the precision bubble level 23. After one rocker plate is true, remove the telescope assembly mounting base and install it on the opposite rocker plate 11. Repeat the above procedures for the second rocker plate 11. Recheck the first rocker plate. When both rocker plates are true and level the telescope assembly can be calibrated.

Figure 7:
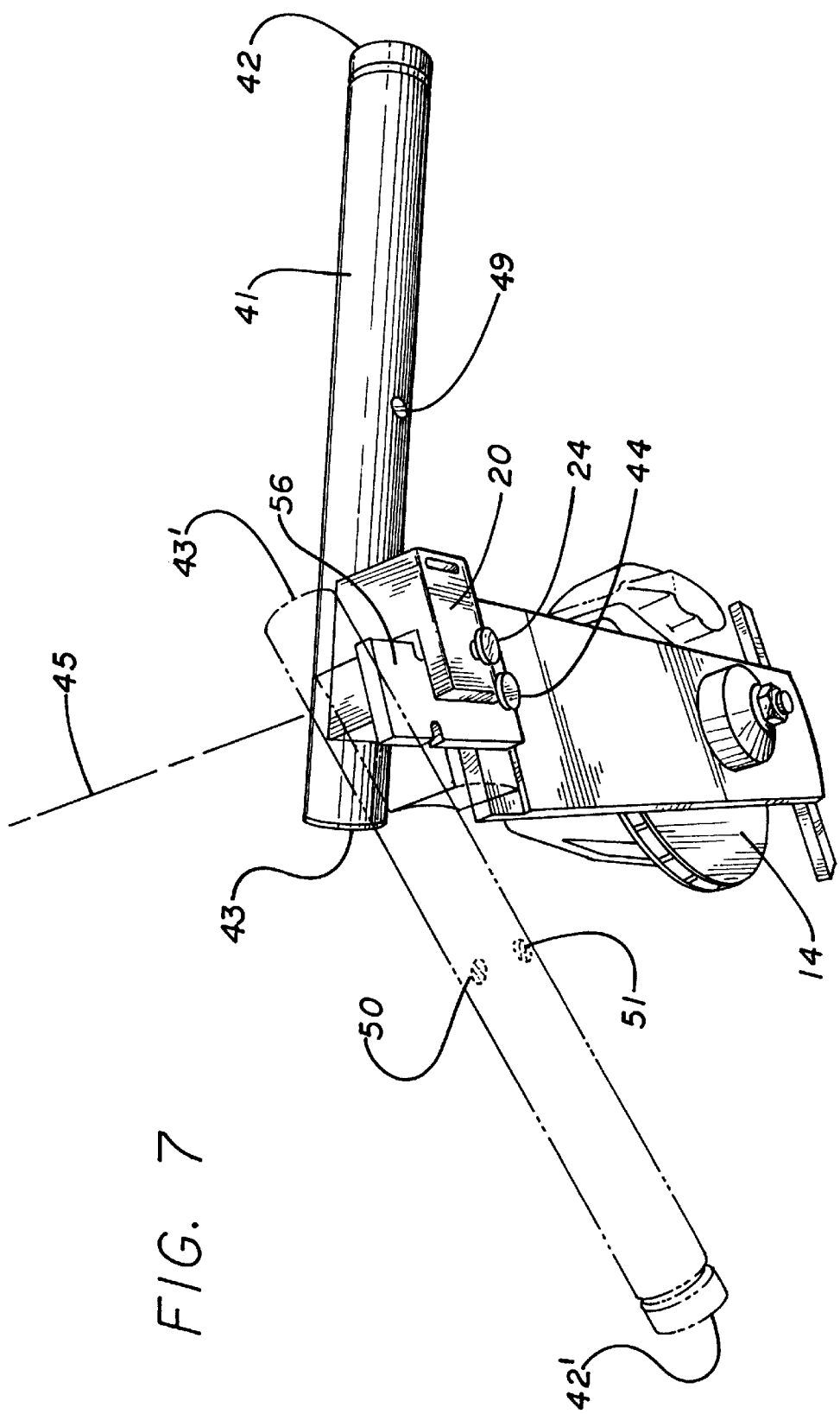
FIG. 7 is a perspective view of the telescope assembly depicting its orientation when rotated ±90° during calibration, with the toe and camber calibration screws visible on the housing of the telescope.
Figure 8:
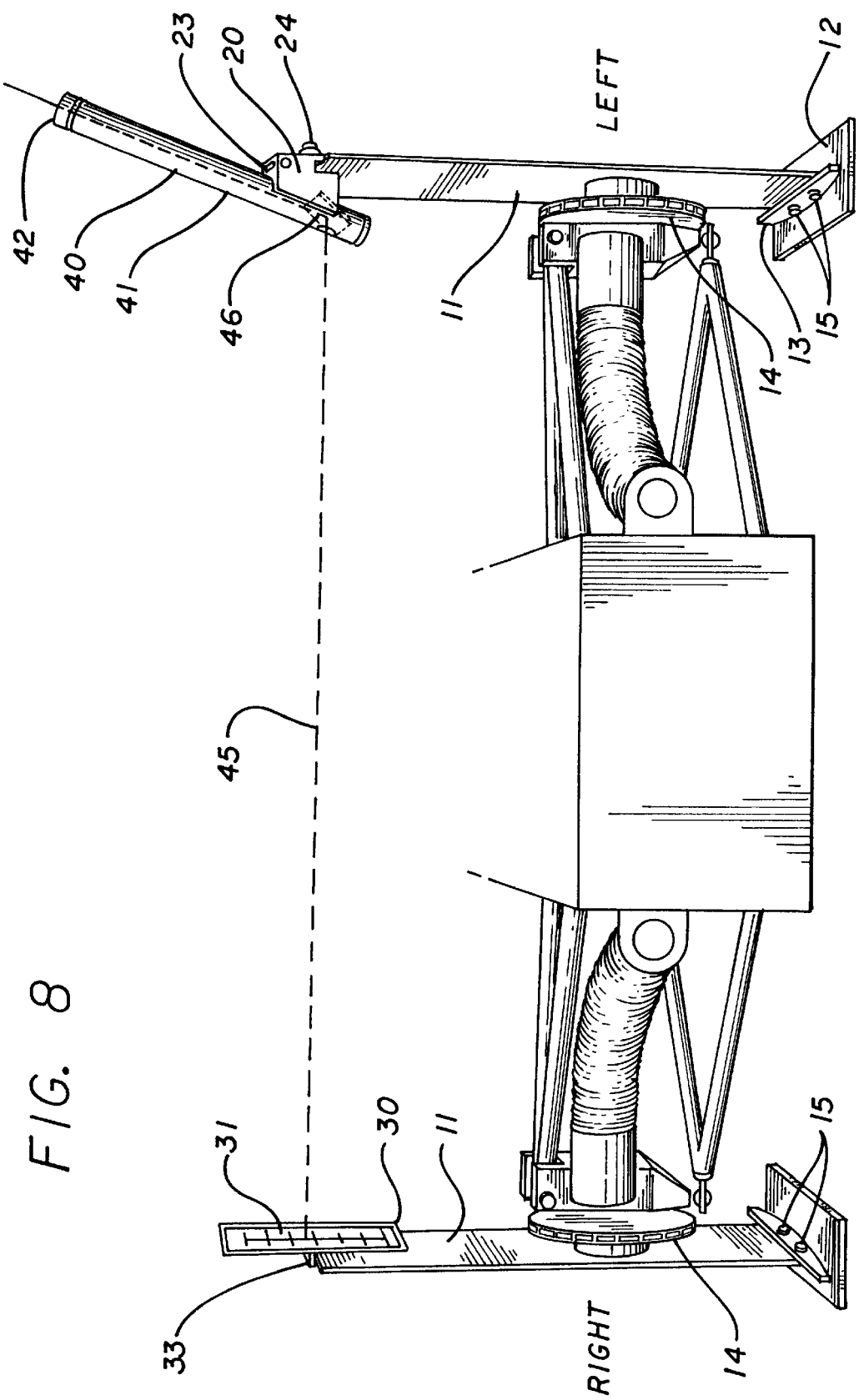
FIG. 8 is a perspective via typical optical wheel alignment apparatus set-up with a partial cutaway of the telescope assembly housing to depict the viewer's sight path.

FIG. 7 depicts a rendition of the invention while the telescope assembly is being calibrated. To calibrate the telescope assembly 40 and assembly mounting base 20, the telescope calibration plate 56 is installed on the rocker plate 11 in the same vertical plane as the telescope assembly 40 and mounting base 20 during alignment procedures. The telescope assembly mounting base 20, with telescope assembly 40 attached, is then mounted in a 90° position from its normal wheel alignment position on the rocker plate 11 and a first sighting of the location of the cross hairs superimposed on the toe and camber alignment chart 31 are recorded by the mechanic. The telescope assembly and mounting base 40 and 20 are then removed as one assembly and rotated 180° and remounted to the rocker plate 11. A second sighting of the cross hair locations on the toe and camber alignment chart 31 are recorded and compared with the previous sightings. If the two cross hair sightings do not fall on exactly the same locations on the chart 31 a slight adjustment of the adjuster lens pinion set screws 50 and 51 is made which reduces the discrepancy between the first and second readings by half, both horizontally and, vertically. The telescope assembly and mounting base 40 and 20 are again remounted in the first calibration position on the rocker plate 11. A new sighting is taken and, if required, minor adjustments of set screws 50 and 51 are again made and the process repeated until absolute agreement of cross hair locations is observed with the telescope assembly 40 and mounting base 20 oriented in the two 180° opposite positions on the rocker plate 11. When calibration is completed, the telescope assembly 40 and mounting base 20 are removed so that the telescope calibration plate 56 can be removed. The telescope assembly 40 and telescope assembly mounting base 20 can then be installed on the rocker plate 11 in the normal vertical position for wheel alignment procedures of the invention described earlier.

Turning now to FIG. 4b, a typical view by the mechanic at the eye piece 42 of the telescope assembly 40 is depicted. In FIG. 4b the right wheel being aligned by the optical alignment apparatus 10 indicates a toe-in condition of 15 minutes and a negative camber of −⅜". If these alignment settings were not within the desired tolerance for the particular race car, the mechanic would adjust the tie rod, and/or the control rod end until the toe and camber alignment chart 31, as viewed at the eye piece 42 at the proximal end of the telescope assembly 40 displayed the desired alignment settings.

While a preferred embodiment of the invention has been illustrated, it will be obvious to those skilled in the art that various modifications and changes may be made thereto without departing from the spirit of the invention as defined in the appended claims.

I claim:

1. An optical wheel alignment apparatus for race car vehicles comprising:
   at least two rocker plates with rocker stops;
   a telescope assembly;
   a telescope assembly mounting base mounting said telescope assembly and adapted to be mounted to a first of said rocker plates;
   at least one target plate assembly with toe and camber alignment chart adapted to be mounted to a second of said rocker plates; and
   a telescope calibration plate adapted to be mounted to said first rocker plate, for mounting of said telescope assembly and telescope assembly mounting base during calibration of said telescope assembly.

2. The apparatus of claim 1, wherein said rocker plates are machined of aluminum, or similar light-weight material.

3. The apparatus of claim 2 further, wherein said rocker plates are at least 5" wide, at least ½" thick, and high enough to extend the plane of the wheel hub above the chassis of said race car vehicle to provide a clear line of sight to an identical rocker plate on the opposite wheel hub.

4. The apparatus of claim 1, wherein said telescope assembly has a proximal end and a distal end and at least one mirror internally mounted near the distal end at an angle appropriate for projecting a target image to the viewer at the proximal end of said telescope assembly.

5. The apparatus of claim 4 further, wherein said telescope assembly contains both toe calibration and camber calibration adjustments in the form of one or more lenses controlled by recessed screws mounted in the telescope assembly housing.

6. The apparatus of claim 1, wherein said telescope assembly mounting base contains a level for precision leveling of said mounting base and attached telescope assembly to one of said rocker plates.

7. The apparatus of claim 1, wherein a telescope assembly calibration plate is included which allows ±90° rotation of said telescope assembly for calibration of said apparatus without disturbing prior calibration settings.

8. The apparatus of claim 1, wherein said target plate assembly contains a target chart which contains both toe and camber calibration indicator markings in the form of vertical and horizontal scribing.

9. The apparatus of claim 8, wherein said target chart is calibrated vertically to indicate + or − camber settings in increments of ¼° per marking, and wherein said target chart is calibrated horizontally to indicate toe-in or toe-out conditions in increments of 5 minutes of a degree.

10. The apparatus of claim 8 further comprising a clamp assembly for mounting said target plate assembly to one of the rocker plates, and at least one roll pin in the clamp assembly for mounting said target plate assembly to one of the rocker plates to ensure repeatability of precision alignment of said target assembly onto said rocker plate.

11. The apparatus of claim 4, wherein a cross-hairs assembly is interposed in the line of sight so as to superimpose said cross-hairs on the target image viewed by the user at the proximal end of said telescope assembly.

12. The apparatus of claim 1, wherein said telescope assembly mounting base contains at least one roll pin in the clamp assembly for mounting said telescope assembly mounting base to one of the rocker plates to ensure repeatability of precision alignment of said telescope assembly onto said rocker plate.

13. A method for providing optical wheel alignment for race car vehicles comprising:
    a) providing a wheel alignment apparatus having;
        at least two rocker plates;
        at least two surface plates with rocker stops;
        a telescope assembly;
        a telescope assembly mounting base;
        at least one target plate assembly with calibration chart with toe and camber alignment markings; and
        a telescope assembly calibration plate.
    b) locating a relatively smooth site that is flat within ±¼" in order to avoid camber error due to diagonal weighting;
    c) removing the wheels on front axle and assuring that the wheel hub faces are clean;
    d) installing a rocker plate onto each wheel hub so that the rocker plate extends above the race car chassis to provide a clear line of sight from one rocker plate to the opposite rocker plate;
    e) placing one surface plate under each rocker plate with said rocker stops installed;
    f) securing steering wheel with a bungee cord, or equivalent, to guarantee the front wheels stay straight during the alignment;
    g) installing the telescope assembly mounting base to one rocker plate, tightening the clamping screw after the base is secured and the roll pins are seated;
    h) securing mild pressure on brake system with bungee cord or equivalent to guarantee the wheels will not move inadvertently;
    i) using a screwdriver under the rocker stop attached to the rocker plate on which the telescope assembly base is installed, adjust the angle of the rocker plate until the internal level on the telescope mounting base indicates a precise, horizontal level;
    j) removing the telescope assembly mounting base from the rocker plate and repeating h and i above to level the opposite rocker plate;
    k) adjusting the toe control rod and/or camber control adjuster on the race car while sighting the cross-hair location on the target chart to establish the precise front wheel camber and toe alignment desired for that wheel;
    l) repeating steps k through p for the opposite wheel alignment;
    m) repeating steps k through p for the two remaining wheels.

14. The method of claim 13 further comprising the following steps:
    a) installing the telescope assembly and the telescope assembly calibration plate on the telescope assembly mounting base;
    b) mounting the target plate onto the opposite rocker plate and tightening the clamp screw after ensuring the target plate is properly seated on the ring pins;
    c) observing the location of the cross-hairs on the target chart, then rotating the telescope ±90° and observing the cross-hair location on the target chart;
    d) adjusting, if necessary, the camber and/or toe calibration screws on the telescope assembly housing until there is no movement of the cross-hair location on the target chart when the telescope assembly is continually rotated on a ±90° axis;
    e) removing the telescope assembly calibration plate as the apparatus is now calibrated to provide a precision wheel alignment.

15. The method of claim 13, wherein said rocker plates are machined of aluminum, or similar light-weight material.

16. The method of claim 15 further, wherein said rocker plates are at least 5" wide, at least ½" thick, and high enough to extend the plane of the wheel hub above the chassis of said automotive vehicle to provide a clear line of sight to an identical rocker plate on the opposite wheel hub.

17. The method of claim 13, wherein said telescope assembly has a proximal end and a distal end and at least one mirror internally mounted near the distal end at an angle appropriate for projecting a target image to the viewer at the proximal end of said telescope assembly.

18. The method of claim 17 further, wherein said telescope assembly contains both toe calibration and camber calibration adjustments for said internal mirror in the form of recessed screws mounted in the telescope assembly housing.

19. The method of claim 13, wherein said telescope assembly mounting base contains a level for precision leveling of said mounting base and attached telescope assembly to one of said apparatus rocker plates.

20. The method of claim 13, wherein a telescope assembly calibration plate is included which allows ±90° rotation of said telescope assembly for calibration of said apparatus without disturbing prior calibration settings.

21. The method of claim 13, wherein said target plate assembly contains a target chart which contains both toe and camber calibration indicator markings in the form of vertical and horizontal scribing.

22. The method of claim 20 further, wherein said target chart is calibrated vertically to indicate + or − camber settings in increments of ¼° per marking and, wherein said target chart is calibrated horizontally to indicate toe-in or toe-out conditions in increments of 5 minutes of a degree.

23. The method of claim 21 further, wherein at least one roll pin in the clamp assembly for mounting said target plate assembly to one of the rocker plates ensure repeatability of precision alignment of said target assembly onto said rocker plate.

24. The method of claim 17, wherein a cross-hairs assembly is interposed in the line of sight so as to superimpose said cross-hairs on the target image viewed by the user at the proximal end of said telescope assembly.

25. The method of claim 13, wherein said telescope assembly mounting base contains at least one roll pin in the clamp assembly for mounting said telescope assembly mounting base to one of the rocker plates to ensure repeatability of precision alignment of said telescope assembly onto said rocker plate.

26. An optical wheel alignment apparatus for race car vehicles comprising:

at least two rocker plates with rocker stops;

a telescope assembly;

a telescope assembly mounting base;

at least one target plate assembly with toe and camber alignment chart, said target plate assembly containing a target chart which contains both toe and camber calibration indicator markings in the form of vertical and horizontal scribing, said target chart being calibrated vertically to indicate + or − camber settings in increments of ¼° per marking and said target chart being calibrated horizontally to indicate toe-in or toe-out conditions in increments of 5 minutes of a degree; and a telescope calibration plate.

27. An optical wheel alignment apparatus for race car vehicles comprising:

at least two rocker plates with rocker stops;

a telescope assembly;

a telescope assembly mounting base;

at least one target plate assembly with toe and camber alignment chart, said target plate assembly containing a target chart which contains both toe and camber calibration indicator markings in the form of vertical and horizontal scribing; and at least one roll pin in the clamp assembly for mounting said target plate assembly to one of the rocker plates to ensure repeatability of precision alignment of said target assembly onto said rocker plate.

* * * * *